United States Patent Office 3,335,197
Patented Aug. 8, 1967

3,335,197
METHOD FOR PREPARATION OF
VINYL AROMATICS
Arnold N. Wennerberg, Chicago, Ill., assignor to Standard Oil Company, Chicago, Ill., a corporation of Indiana
No Drawing. Filed Aug. 16, 1963, Ser. No. 302,731
7 Claims. (Cl. 260—669)

This invention relates to a method of preparing vinyl aromatic hydrocarbons and more specifically pertains to a method of catalytically dehydrogenating alkyl substituted aromatics.

Among the vinyl aromatics which have been extensively used in commercial polymerization processes, the best known are styrene, alpha-methlystyrene and alpha,para-dimethylstyrene. These vinyl aromatics have found use as homopolymers as a principal comonomer in the production of modified vinyl benzene polymers as well as a secondary comonomer for example in the production of butadiene-styrene rubbery copolymers. Many processes have been suggested for the preparation of vinyl aromatic hydrocarbons. In general, catalytic dehydrogenation of ethyl substituted and isopropyl substituted aromatics has found some favor in the preparation of vinyl aromatic hydrocarbons. One of the catalytic dehydrogenation processes for the preparation of styrene from ethylbenzene and alpha-methylstyrene from cumene is a flow process which involves contacting a mixture of steam and ethylbenzene or cumene preheated to about 600° C. with a dehydrogenation catalyst at 600° C. at rather low liquid hourly space velocities (volume of hydrocarbon feed per volume of catalyst per hour) in the range of about LHSV 0.7 to about 1. In these commercial processes the dilution of ethylbenzene or cumene with steam is sufficient to provide a feed pressure of about 3 p.s.i. absolute, that is, the partial pressure of styrene or cumene averages about 0.1 atmosphere in the mixture in the catalyst zone. Such flow processes are conducted at about atmospheric pressure with respect to discharge of the dehydrogenation reaction mixture from the catalyst zone. The feedstock, mixture of steam and ethylbenzene or steam and cumene are charged to the dehydrogenation process at a pressure slightly above atmospheric pressure, generally to provide only about that amount of pressure over atmospheric pressure to offset the pressure drop in the catalytic conversion zone. Typical results obtained from such commercial processes are initial conversions in the range of 35 to 38% per pass of ethylbenzene or cumene with a selectivity of about 90 to 92%.

A new catalytic dehydrogenation process has been discovered for converting ethyl and isopropyl substituted aromatics at a temperature above 400° C. by contacting ethyl and isopropyl substituted aromatics with a catalyst containing alumina and oxide of an alkaline earth metal and an oxide of a low melting metal having an atomic weight of about 65 to about 113. The catalyst used in the process of this invetnion then is a combination of oxides of three different metals. This catalyst is sensitive to steam and thus where a diluent is desired one may be selected from inert and non-reactive gases such as nitrogen or neon or argon and the like. Also hydrocarbon vapors may be used as a diluent in the process of this invention where a diluent is desired. Since the ethyl and isopropyl substituted aromatics are soluble in benzene and benzene is highly refractory under the temperature conditions at which the dehydrogenations are carried out, the use of benzene vapors as a diluent has many advantages. Other hydrocarbons such as the alkanes can be used as diluents since the alkanes are not dehydrogenated by the catalyst used in the process of this invention.

The process of this invention is useful for the dehydrogenation of aliphatic nuclear substituted aromatic compounds whose aliphatic substituents are characterized by containing a 2 carbon saturated alkyl hydrocarbon chain having a total of 2 to 3 carbon atoms to vinyl substituted aromatics. Specific compounds illustrating but not limiting the foregoing alkyl substituted aromatics are:

ethylbenzene
p-diethylbenzene
p-ethyltoluene
cumene
p-cymene
p-diisopropylbenzene
1-ethyl-3,5-dimethylbenzene
1,3-diethyl-5-methylbenzene
1,4-diethyl-2-methylbenzene
p-ethyl cumene
1-ethyl-3,5-diisopropylbenzene
1,3-diethyl cumene
1,3,5-triethylbenzene
1,3,5-triisopropylbenzene
1-ethylnaphthalene
1-isopropylnaphthalene
2,6-diethylnaphthalene
2,6-diisopropylnaphthalene
4,4'-diethyl biphenyl
4,4'-diisopropyl biphenyl
4-naphthylbutene-1
p,p'-bis-(2-methylbuten-1-yl)biphenyl and the like substituted aromatic hydrocarbons.

The catalyst used in the process of this invention contains alumina and for each 10 weight parts thereof 0.1 to 5 weight parts of an oxide of an alkaline earth metal and 0.1 to 5 weight parts of an oxide of the low melting metal of atomic weight of about 65 to about 113. Desirable catalyst compositions contain with alumina either zinc oxide or cadmium oxide with one of calcium oxide or barium oxide or magnesium oxide in the foregoing weight ratios. The preferred catalyst contains zinc oxide and alumina and one of the three specific aforementioned oxides of alkaline earth metal. The most preferred catalyst composition contains zinc oxide, magnesium oxide and alumina in the aforementioned weight ratios.

When the term "alumina" or the chemical formula "$Al_2O_3$" are used herein in the definition or description of the catalyst used in the process of this invention, these terms are used to designate activated or catalytic alumina and not to include alpha alumina which does not possess catalytic activity in hydrocarbon conversion processes. As hereinbefore indicated the three different metals which comprise the catalyst used in the process of this invention are suitably present in the weight ratio range for each 10 parts of alumina 0.1 to 10 parts each of alkaline earth metal oxide and oxide of the defined low melting metal. The weight ratio of CaO, MgO or BaO and CdO or ZnO desirably are of each class is in the weight ratio range of 0.5 to 8 and preferably each class is in the weight ratio range of 0.5 to 5 for each 10 parts of alumina. The catalyst composition can be prepared by depositing, for example $Mg(OH)_2$ and molten zinc on alumina particles and calcining the resulting mixture at 500 to 600° C. or by impregnating alumina particles with, for example, magnesium and zinc compounds which on calcining are converted to their oxides; or by forming a solution or dispersion of compounds of aluminum, zinc and magnesium; co-precipitating the metals in a form convertible to their oxides and calcining the precipitate; or by any other convenient method.

The process of this invention is also a flow process whereby the feed hydrocarbon or a mixture thereof with an inert or non-reactive gas or vapors of an alkene hydrocarbon or an aromatic hydrocarbon such as benzene, toluene and the xylenes preheated to dehydrogenation temperature are contacted in a catalytic conversion zone with the catalyst comprising oxides of three different metals hereinbefore described. Suitably the dehydrogenation process can be carried out at a pressure measured at the exit end of the catalytic conversion zone of about 2 atmospheres. Desirably an exit pressure of from 1.0 to about 1.5 atmospheres and preferably 1.0 to 1.25 atmospheres as the maximum exit pressures can be used. Also, the exit pressure may be a subatmospheric pressure down to as low as is feasible in a commercial operation. Exit pressures of about 2 atmospheres favor the dehydrogenation equilibrium reaction to the formation of the feed aromatic hydrocarbon. As the exit pressure is reduced below atmospheric pressure, enhancement of the dehydrogenation to the desired product does not occur to any appreciable extent over average operations at 1 atmosphere. Thus, as the exit pressure is reduced below 1 atmosphere the equilibrium reaction mixture distribution does not change to any appreciable extent. Thus, the minimum temperature below atmospheric pressure is governed more by design and economic limitations than by the thermohynamic considerations. For a positive pressure flow process, it is desirable to have an absolute pressure of the feed aliphatic substituted aromatic compound in the range of about 1 to about 10 pounds per square inch absolute (p.s.i.a.). This low partial pressure is, of course, accomplished by the aforementioned dilutions. When exit pressures below atmospheric pressure are employed dilution of the feed hydrocarbon is diminished. For most practical purposes a minimum of about 125 mm. Hg absolute pressure of feed hydrocarbon is used for the flow process having as an exit pressure a pressure below 1 atmosphere.

The catalyst used in the process of this invention can tolerate high rates of feed. The catalyst also functions efficiently at low rates of feed. Suitable operating conditions can be achieved with rates of feed expressed as volume of the feed hydrocarbon as a liquid per volume of catalyst per hour which is conventionally expressed as LHSV in the range of from about 1 to about 20, desirably in the range of from about 1 to about 10 and preferably in the range of from about 3 to about 7.

The process of this invention can be carried out with the aforementioned combination of oxides of three different metals in a fixed bed of granular catalyst, a moving catalyst bed or a fluidized catalyst bed. The latter offers substantial advantages in that the activated catalyst can be continuously withdrawn and regenerated for example, by burning off at 500 to 600° C. carbonaceous deposits causing the deactivation of the catalyst with dilute oxygen-containing gas, for example, a mixture of from 2 to about 10 percent oxygen with 98 to 90 percent carbon dioxide both on a volume basis. The regenerated catalyst is, of course, hot and can serve as a source of heat as the hot regenerated catalyst is recycled to the catalytic conversion zone to supply a portion or all of the heat necessary for the endothermic dehydrogenation reaction. For a fixed bed operation the feedstock (substituted aromatic hydrocarbon admixed with diluent) is passed into a preheating zone and heated to the dehydrogenation reaction temperature. Thereafter the preheated feedstock is contacted with the catalyst at the dehydrogenation temperature. Since the catalytic conversion zone effluent is at a relatively low pressure, it is lead to a cooling zone to condense the resulting hydrocarbon, the condensate fractionated to recover the desired product and the unconverted feed hydrocarbon recycled to extinction.

Suitable temperatures for preparing vinyl aromatics by the process of this invention are temperatures above 400° C. but not exceeding the thermal decomposition temperature of the hydrocarbon feeds or products. Desirably the dehydrogenation temperatures are in the range of from 450 to 650° C. and preferably are in the range of 500 to 600° C. inclusive.

The process of this invention can be more readily understood from the following ilustrative examples.

*Example 1*

A mixture of nitrogen and ethylbenzene in the mole ratio of 9 to 1 is charged into a preheater and heated to about 600° C. and then contacted with a catalyst containing the three different metal oxides in the ratio of about 3 weight parts zinc oxide, 3 weight parts magnesium oxide and 10 weight parts alumina maintained at about 600° C. The feed stock is introduced to provide an ethylbenzene to catalyst ratio of five liquid volumes ethylbenzene per volume of catalyst per hour. The exit pressure from the catalyst conversion zone was set so that the ethylbenzene absolute pressure averaged about 0.2 atmosphere in the catalytic conversion zone. By this process there is obtained a styrene conversion liquid product distribution containing 50.6% ethylbenzene, 1.0% toluene, 0.4% benzene and 48.0% styrene. The liquid product recovery is 97% of theory. The selectivity of conversion of ethylbenzene to styrene is 97%. The initial conversion of ethylbenzene to styrene at about 5 minutes after the catalyst has been contacted with ethylbenzene is about 48%. After about 2 hours on stream the conversion of ethylbenzene to styrene on a product basis is 43%.

*Example 2*

The process of Example 1 is repeated except that cumene is substituted for ethylbenzene. By this process alpha-methylstyrene is obtained. The mixture of hydrocarbons produced by this catalytic conversion process (liquid product distribution) consists of 0.43% benzene, 0.27% toluene, 1.28% ethylbenzene, 2.10% styrene, other products neither identifiable with the foregoing, with cumene or with alpha-methylstyrene 0.92%, cumene 37.6% and alpha-methylstyrene 54.4%. In this process liquid product recovery is 98.5%. The selectivity of this process on product basis is 92%. Also in this process the initial conversion (five minutes after first contact of feed hydrocarbon with catalyst) is 57.4% and the conversion diminished slightly to 52% after about 2 hours of on stream operation.

The results of the two foregoing processes when compared to the aforementioned commercial process, illustrates the superiority of the process of this invention over processes which have long enjoyed commercial exploitation. Another commercial process using a still different catalyst system produces typically under conditions similar to Example 1 except that the catalyst can only tolerate very low LHSV feed hydrocarbon rates such as about .7 to 1.0. Typical conversions are about 75 weight percent on product at about 93 to 94% selectivity. Again, the superiority of the process of this invention is apparent.

With the foregoing disclosure and illustration of the process of this invention those skilled in the art can readily select particular component metal oxides, the feed and feedstock composition, feed rate, temperature and reaction pressure most suitable for their specific purposes and economics of their process design (combination of apparatus).

What is claimed is:

1. A method of preparing a vinyl substituted aromatic hydrocarbon comprising contacting an aromatic hydrocarbon having at least one alkyl hydrocarbon substituent of only two to three carbon atoms in its hydrocarbon chain in a catalytic conversion zone at a temperature above 400° C. with a catalyst consisting of a combination of three different metal oxide components of which one is alumina and the other two are one each of an alkaline earth metal oxide and of an oxide of a low melting metal selected from the class consisting of zinc and cadmium in the component weight ratio of for each 10 parts alumina, 0.5 to 8 parts each of the alkaline earth metal oxide and the oxide of said low melting metal.

2. The method of claim 1 wherein the alkaline earth metal oxide is one of magnesium oxide, calcium oxide and barium oxide.

3. The method of claim 1 wherein the catalyst is a combination of alumina, zinc oxide and magnesium oxide.

4. The method of claim 3 wherein the catalyst contains for each 10 weight parts of alumina 3.0 weight parts each of zinc oxide and magnesium oxide.

5. The method of claim 4 wherein ethylbenzene is contacted with the catalyst to produce styrene.

6. The method of claim 4 wherein a benzene substituted with at least one isopropyl hydrocarbon substituent is contacted with the catalyst to produce a methyl substituted styrene.

7. The method of claim 4 wherein cumene is contacted with the catalyst to produce α-methylstyrene.

References Cited

Ohlinger: I. G. Farben Report O.P.B. No. 13,363; Report No. RM-302 (Sept. 27, 1945); pages 1-8 of translation relied upon.

DELBERT E. GANTZ, *Primary Examiner.*

C. R. DAVIS, *Assistant Examiner.*